United States Patent [19]

Weaver

[11] 4,432,687
[45] Feb. 21, 1984

[54] SILO UNLOADING APPARATUS

[76] Inventor: Richard L. Weaver, R.D. 4, Myerstown, Pa. 17067

[21] Appl. No.: 302,191

[22] Filed: Sep. 14, 1981

Related U.S. Application Data

[63] Continuation-in-part of Ser. No. 191,071, Sep. 26, 1980, Pat. No. 4,377,364.

[51] Int. Cl.³ .............................................. B65G 65/46
[52] U.S. Cl. ...................................... 414/307; 414/310
[58] Field of Search ................................. 414/306–312

[56] References Cited

U.S. PATENT DOCUMENTS 3,338,434 8/1967 Kolze .............................. 414/306 X
3,851,774 12/1974 Laidig et al. ................... 414/310 X Primary Examiner—Robert G. Sheridan
Attorney, Agent, or Firm—Paul & Paul

[57] ABSTRACT

Silo unloading apparatus of the bottom unloading type is provided, wherein an auger is mounted for rotation on its own axis and for arcuate sweeping motion across the floor of the silo, conveying silage toward a central opening, and a single drive is provided for driving a central shaft that both rotates the auger about its own axis, and which rotates an intermediate mechanism that transfers relatively uniform rotational motion from the shaft into an intermittent rotational motion whereby a ring gear located beneath the center of the silo and which carries the mount for the auger, may be engaged by push-pull mechanisms that function as force or torque multipliers. The ring gear, upon being engaged and moved, caused the incremental sweeping motion of the auger across the floor. A manual adjustment is provided for interrupting the advancing motion of the auger, if desired. A switch mechanism disposed in a hopper beneath the auger, which switch is sensitive to the presence or absence of silage therein, and can actuate the single motor that drives the central shaft, when the hopper is sufficiently empty to accommodate the receipt of additional silage therein.

17 Claims, 5 Drawing Figures

SILO UNLOADING APPARATUS

CROSS-REFERENCE TO RELATED APPLICATIONS

This is a continuation-in-part of application Ser. No. 191,071, filed Sept. 26, 1980, now U.S. Pat. No. 4,377,364, issued Mar. 22, 1983, the entire disclosure of which is herein incorporated by reference.

BACKGROUND OF THE INVENTION

The present invention is directed to the art of unloading a silo, and particularly to a silo unloader of the bottom unloading type, wherein silage is conveyed to a central opening in the silo floor, to drop down a chute from that opening, into a zone beneath the silo floor, and then to be delivered from that zone to a point outside the silo, by means of an exit auger. Similar devices have been developed in the past, such as are shown in U.S. Pat. Nos. 4,095,703 and 4,057,151. Such devices generally work very well, and are particularly advantageous for silos of wider diameters, where it is desirable to effect the advancing of the auger across the floor, by engaging the auger at a point remote from the center of the silo, in order to provide the necessary forces for pushing the auger into silage that is accumulated remote distances from the center of the silo.

The present invention is directed principally to those silo unloaders of the bottom unloader types, in which the silos are generally smaller in diameter and consequently the resistance that the auger meets upon being advanced forward across the floor of a silo, is necessarily less than with silos of larger diameters. Consequently, the drive for advancing the auger across the floor may take place at a more central location, and still achieve the necessary forces for driving the auger into silage.

To this end, the present invention is addressed to driving the auger, in its sweeping motion, through a generally centrally located auger mount.

SUMMARY OF THE INVENTION

The present invention is directed toward an intermittent drive provided for a auger, in its sweeping motion, through a generally central mount at the bottom of the silo, by means of rotationally driving a ring-like portion of the mount. The drive for the ring-like portion of the mount will preferrably be from the same motor that provides the rotation of the auger on its own axis, and will preferrably be disconnectable therefrom, by manual means, upon the auger meeting compacted silage. A conversion mechanism is provided as part of the intermittent drive means for converting a continuous rotational motion of a generally central drive shaft, into an intermittent motion that is provided by a pair of successively operatively connected torque or force multipliers. The force multipliers may include eccentrics mounted on shaft, for driving drive rods in a push-pull motion. A sensing device in the hopper below the silo discharge opening may sense silage accumulation or vacation, and accordingly deactuate or actuate the auger drive.

Accordingly, it is a primary object of this invention to provide a novel combination drive for an auger conveyor of the silo bottom unloader type, in which a common drive provides both the motion for the rotation of the auger on its own axis, and an intermittent advancement or sweep of the auger across the silo floor by driving the auger from a generally radial central location within the silo.

It is another object of this invention to accomplish the above object, wherein a conversion mechanism is employed as part of the intermittent drive for the auger, for taking a continuous rotational motion from a central drive shaft, and converting it into the intermittent drive.

It is a further object of this invention to drive an auger, in its intermittent sweeping motion across the silo floor, by means of driving the auger mount from a generally central silo floor location.

It is another object of this invention to provide a mechanism for driving an auger, wherein a pair of successively operatively connected torque multiplier devices are employed.

It is a further object of this invention to provide a common motive drive for both rotating an auger of a silo of the bottom unloader type, as well as for providing an intermittent sweeping motion across the silo floor, with a disconnect means being provided, for disconnecting the sweeping motion from the auger rotation motion.

It is another object of this invention to provide novel force or torque multiplier apparatus.

Other objects and advantages will be readily understood from a reading of the following brief descriptions of the drawing figures, detailed descriptions of the preferred embodiments, and the appended claims.

BRIEF DESCRIPTIONS OF THE DRAWING FIGURES

DETAILED DESCRIPTION OF THE PREFERRED EMBODIMENTS

Figure 1:
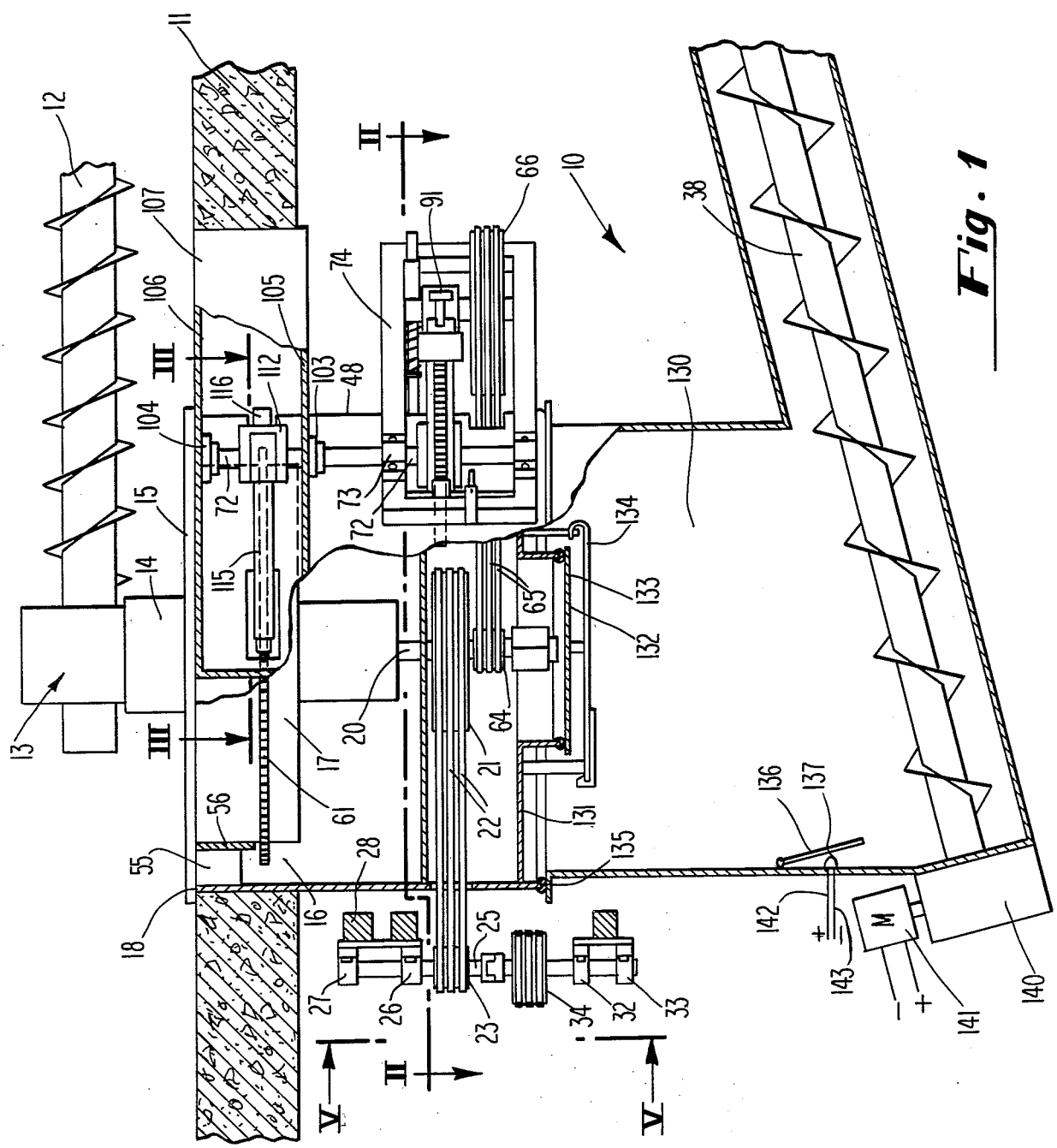
FIG. 1 is a fragmentary vertical sectional view, taken through a silo and unloader mechanism in accordance with this invention.

Referring now to the drawings in detail, reference is first made to FIG. 1, wherein there is illustrated the unloading apparatus of this invention, generally designated by the numeral 10. The lower floor of the silo is indicated by the number 11 and shows a fragmentary illustrated auger 12 mounted in an auger mount 13, at its left end, or generally centrally of the silage discharge opening 16. The auger 12 is therefore mounted at its radial intermost end, with the mount 13 including a bearing therein, that engages the portion of the auger 12 that passes therethrough, with the bearing 13 being suitably carried for rotation by a gear box 14 that, in turn, is mounted on a diametrically disposed plate 15.

The mount 13, carried by the gear box or other transmission device 14, is in turn, ultimately carried by the transverse plate 15, retangular in plan view (not shown), and extending diametrically, but chordally, across the top of the opening 16 in the center of the silo. The plate 15 is thus mounted on the silo floor, rigidly, at 18, and while it extends across the entire opening 16 as viewed in FIG. 1, is relatively narrow as viewed in plan (not shown) to allow for passage of silage thereby, in front of, and behind the plate 15 as viewed in FIG. 1.

Figure 2:
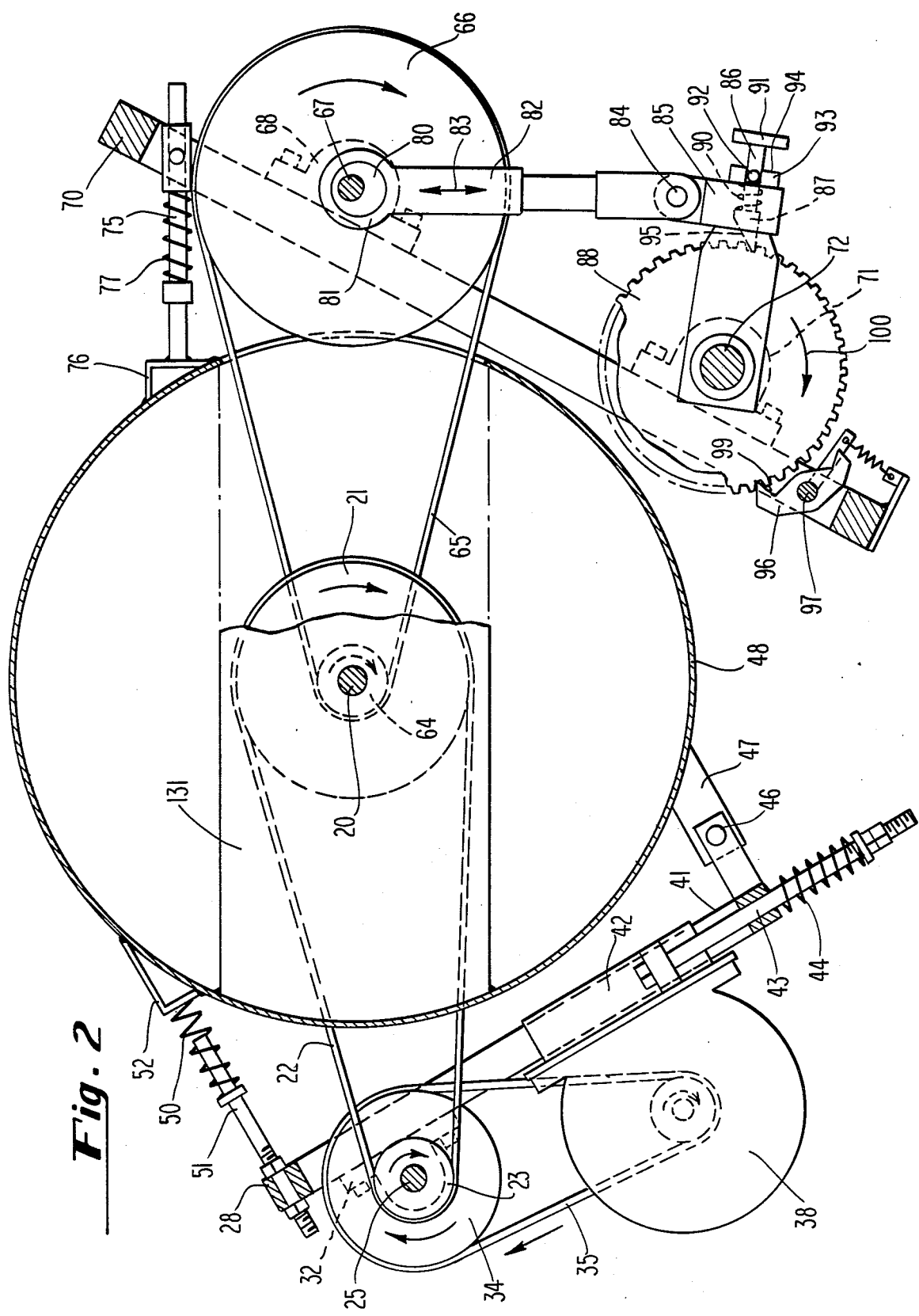
FIG. 2 is an enlarged and fragmentary transverse sectional view, taken generally along the line II—II of FIG. 1, and illustrates an example of a conversion of substantially uniform rotary motion, into intermittent rotational motion for driving the auger in its sweeping motion across the silo floor.
Figure 4:
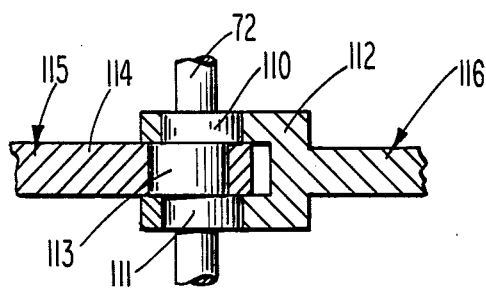
FIG. 4 is an enlarged and fragmentary vertical sectional view, taken through the shaft eccentrics illustrated in FIG. 3, generally along the line IV—IV of FIG. 3.
Figure 5:
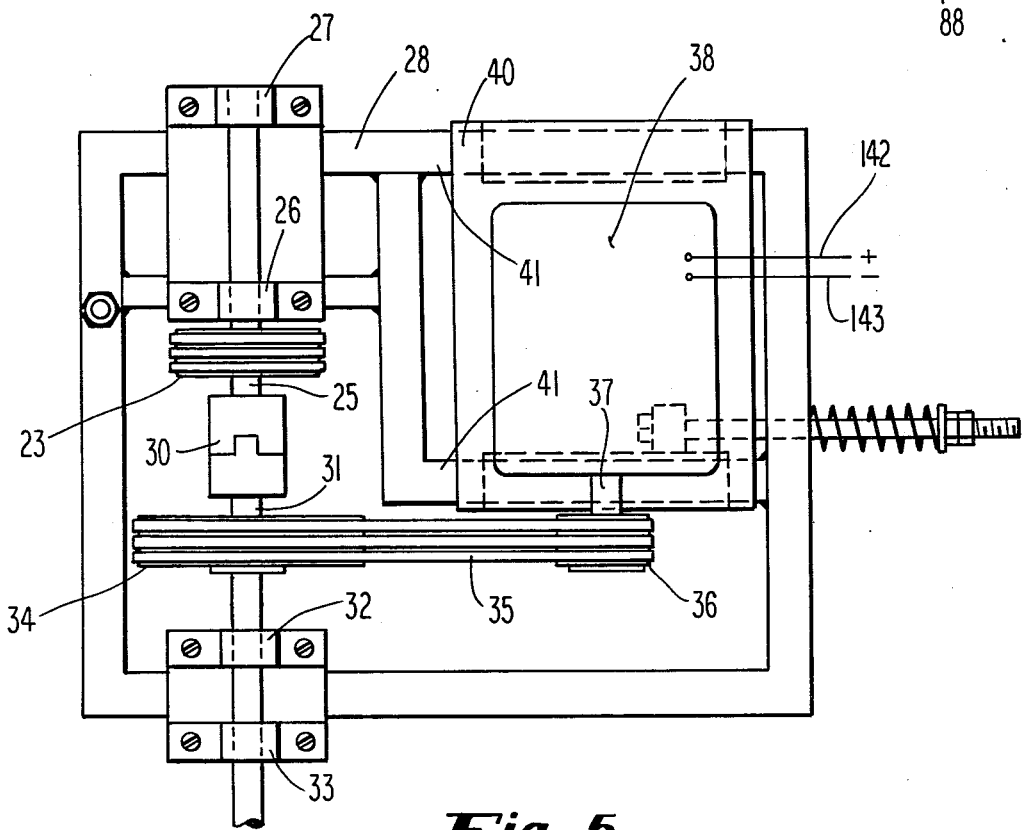
FIG. 5 is a side elevational view, of the drive motor and pulley arrangements of this invention, taken generally along the line V—V of FIG. 1.

Thus, the mount 13 moves rotationally relative to the plate 15 that supports the transmission device 14 and the mount 13. The transmission device 14 effects a right angle change of direction, from the rotating motion provided by the main drive shaft 20, to drive the auger 12 about its own axis. The main drive shaft 20 is driven through pulley 21, that in turn is driven by belts 22 as illustrated in FIG. 2, that in turn are driven from pulley 23. The pulley 23 is carried on a shaft 25, that in turn projects endwise from bearings 26 and 27, that in turn, are carried by mounting frame 28. A clutch device 30 connects shaft 25, and a shaft 31, for transmitting drive from the shaft 31, to the shaft 25. The shaft 31 is likewise bearing mounted at 32 and 33, by bearings that are also carried on mounting block 28 as viewed in FIG. 5. The shaft 31 is driven by means of a pulley 34, that, in turn, is driven by pulley belts 35, that are driven by pulley 36 carried by main motor shaft 37.

The motor 38, for driving the above drive chain, and consequently, the main drive shaft 20, is generally an electric AC motor, mounted on a sliding base 40 that is carried by the mounting bracket 28, for sliding backward and forward along guide rails 41 thereof, by means of a slide mount 42, illustrated in FIG. 2, that carries guide posts 43 having compression springs 44 thereon, for urging the motor as viewed in FIG. 2, in a direction that will maintain the pulley belts 35, in taut condition.

The mounting bracket 28 is pivot mounted at 46, on a support arm 47, that in turn, is carried on the exterior of the cylindrical sheet metal chute 48, that depends downward, rigidly disposed, and carried from the floor 11 of the silo. The left-most end of the mounting bracket 28 is urged away from the chute 48, by means of a compression spring 50 carried on spring guide 51, and urged against a spring seat 52, also carried by the exterior of the chute 48. Consequently, it will be seen that the mounting bracket 28 is urged into an outwardly pivoted condition, whereby the belts 22 may remain taut.

A plurality of supports 55 extend radially inwardly from the chute 48, for supporting a fixed cylindrical member 56 carried therein, inside which rotates a ring-like portion 17, as dictated by the intermittent drive means described hereinafter.

The ring-like portion 17 is thus moveable in a clockwise direction, as viewed in FIG. 3, by means of dogs 58 and 60, that engage in a toothed periphery 61, as will be described hereinafter.

The intermittent drive for advancing the auger across the silo floor is provided as follows. The main drive shaft 20 is provided with a pulley 64 carried thereby, for rotation therewith, as dictated by the motor 38. As the pulley 64 is driven, it drives drive belts 65, that, in turn, drive pulley 66 in the clockwise direction illustrated in FIG. 2. The pulley 66 is mounted so as to have its shaft 67 carried by a bearing 68. The bearing 68 is carried by a pulley support 70. The support 70 is provided with a bearing 71 on its other end, that mounts a shaft 72, which shaft 72 is provided with a bearing mount 73, which mount 73 serves to fixedly mount shaft 72 to frame 74. Consequently, the pulley mount 70 is mounted for pivotal movement at shaft 72, at its lower end as viewed in FIG. 2, but is mounted for sliding movement along guide rod 75 at its upper end, in order to maintain the belts 65 taut as shown. The guide 75 is carried on the exterior of the chute 48, by means of a mounting bracket 76, and compression springs 77, urge the pulley 66 toward a taut condition of the belt 65.

An eccentric 80 is carried on shaft 67, for rotation therewith, and, in turn, has a bearing 81 slidably mounted thereon, the bearing 81 comprising one end of a drive rod 82 that functions as a push-pull rod, moveable backward and forward, in the direction of the double headed arrow 83, as dictated by the rotating eccentric 80. The drive rod 82 has a pivoted connection at 84 at its lower end as viewed in FIG. 2, terminating in a plunger mount 85.

Disposed in and carried by the plunger mount 85, is a spring-biased plunger 86, having a chamfered tooth-engaging tip 87, normally maintained in tooth-engaged position between teeth of a toothed sprocket wheel 88, as shown, by means of compression spring 90. The plunger 86 has a manually actuable handle 91, to be engaged and retracted, such that the tip 87 is withdrawn from the teeth, against the force applied by the spring 90, and such that the locking key 92 carried by the plunger 86 is withdrawn beyond the keyway member 93, and the plunger handle 91 is turned, such that the key 92 engages against an outer surface 94 of the keyway member 93, so that the tip 87 is in disengaged relation relative to the toothed wheel 88. The manual actuation will generally be done, when the auger has advanced into compacted silage, and it is desired to continue the rotation of the auger on its own axis, for clearing the compacted silage while the auger remains in a fixed position relative to the silo floor, and consequently it is desired to disengage temporarily the sweeping motion of the auger 12 across the floor 11. This will leave the drive rod 82, moving in a back-and-forth motion, without transmitting a drive to the toothed wheel 88.

It will be noted that the operation described above, for driving the rod 82, and consequently the plunger tip 87 by means of the eccentric 80, effects a conversion of a continuous rotary motion, into a discontinuous or intermittent linear back-and-forth motion of the plunger tip 87, that acts to drive the toothed wheel 88 in an intermittent rotational motion. Also, the toothed wheel 88 is driven through only a short arc with each rotation of the eccentric 80, and consequently a greater rotational motion of the shaft 20, and of the eccentric 80, is translated into a lesser, or shorter arcuate or intermittent rotational motion of the sprocket 88, and thereby the mechanism for doing so functions as a force or torque multiplier for allowing a larger motion of lesser torque, delivering a smaller motion of greater torque.

It will also be noted that the chamfered surface 95 of the plunger tip 87 allows the plunger tip 87, upon its retracted motion, or upward as viewed in FIG. 2, to ride up over a tooth of the toothed wheel, against the compressive force provided by the spring 90, in the returning or retracted motion of the drive rod 82. A pawl 96, pivotally mounted at 97, and spring-biased into engagement with the toothed periphery of the toothed wheel 88, as shown in FIG. 2 by means of an extension spring 98, functions to maintain the toothed wheel 88 in a given position, to which it has been moved upon downward motion of the plunger tip 87, but which will hold the wheel 88 in that position while the chamfered surface 95 is riding up over a tooth, in its return motion, so that the cam surface 99 of the pawl 96 allows movement of the sprocket wheel 88 only in the direction of the arrow 100 illustrated in FIG. 2. Consequently, the pawl 96, together with the plunger 86, function with the toothed sprocket wheel 88, as a ratchet device.

The toothed wheel 88 thereby provides intermittent rotation to the shaft 72.

Figure 3:
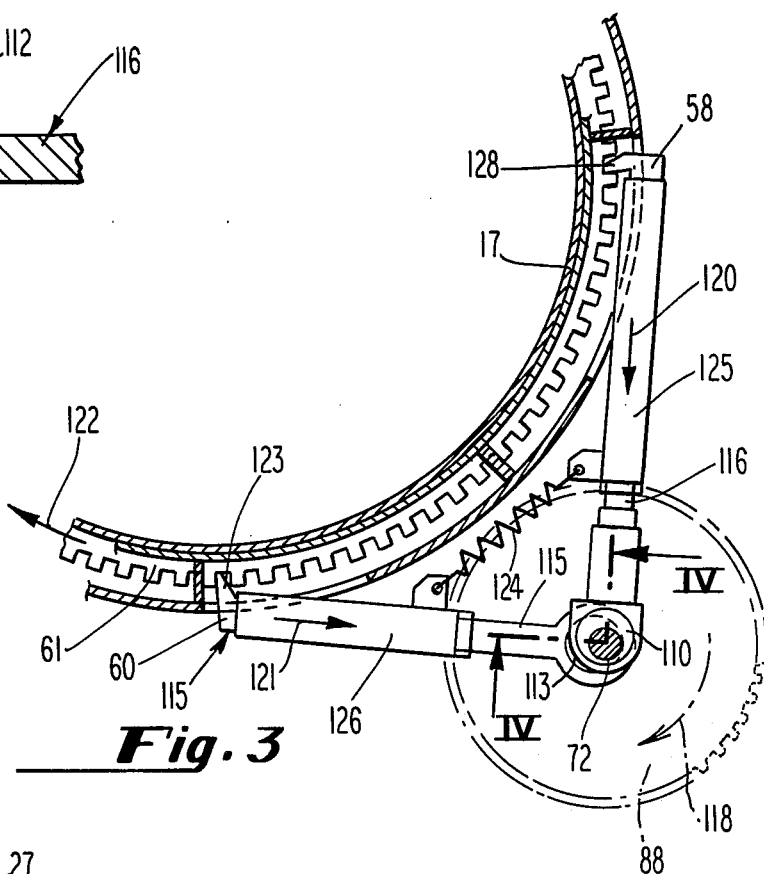
FIG. 3 is an enlarged and fragmentary transverse sectional view, taken through the ring gear drive of this invention, generally along the line III—III of FIG. 1.

With reference to FIGS. 1 and 3, it will be seen that the shaft 72 extends upwardly, and is mounted by bearing members 103 and 104, carried respectively by walls 105 and 106 of a housing member 107. The shaft 72 has a pair of eccentrics 110 and 111 carried thereby, for rotation therewith, that in turn are rotatively carried in legs of a yoke member 112.

Another eccentric 113 is rotationally carried in bearing member 114 of a drive rod 115. The yoke member 112 functions as one end of a drive rod 116. Rotation of the toothed sprocket wheel 88, in the clockwise direction of the arrow 118 illustrated in FIG. 3, will simultaneously drive the drive rod 116 in the direction of the arrow 120, as it drives the drive rod 115, in the retracted direction of the arrow 121 of FIG. 3. The effect of this, is that dog 58, in engagement with the toothed ring portion 61, will drive the ring portion 61 in an intermittent rotational motion, in the clockwise direction of the arrow 122, with the mechanism again functioning to translate a larger arcuate motion of the toothed wheel 88, into a smaller arcuate motion, or angular rotation of the toothed wheel 61, thereby undergoing a force or torque multiplication. Upon the drive rod 115 being moved in a retracted direction, the dog 60, by means of its chamfered surface 123, will slide over teeth of the toothed wheel 61, against the force provided by extension spring 124. Extension spring 124 tends to urge the drive rods 115 and 116, toward each other, in that it connects their middle portions 125 and 126 respectively carried thereby. The rods 115 and 116 are adjustable in length, with threaded adjustment nuts 129 disposed inwardly of the middle portions 125 and 126.

When the eccentrics 110 and 111 function to drive the drive rod 116 upwardly, contrary to the direction of the arrow 120, it will be seen that the chamfered surface 128 of dog 56 will ride up over the toothed periphery of ring-like portion 61, while the dog 60, urged by the eccentric 113 operating through the drive rod 115, will engage between teeth of the toothed ring portion 61, and drive the same in the direction of arrow 122, as the drive rod 115 moves contrary to the direction of the arrow 121.

It will thus be apparent that the motion of the toothed wheel 88 is translated to the toothed wheel or ring portion 61, for driving the ring member 17 in the direction of the arrow 122, by means of a ratchet-like mechanism described above.

The drive of the ring-portion 17, thereby drives the mount member 13 in the same arcuate motion as the member 17, and thereby provides the intermittent sweeping drive for the auger 12, across the floor of the silo.

It will be apparent from the foregoing that silage therefore is conveyed along the flites of the auger 12, toward the opening 16 provided in the discharge chute 48, to be delivered into the hopper 130.

The pulleys 21 and 64, and their associated belts 22 and 65, are housed in a housing member 131 that extends chordally, diametrically across the interior of the chute 48, for shrouding those belts, pulleys, etc. from being clogged with silage passing through the opening 16.

Access is provided into the bottom of the housing 131 by means of an openable closure 132, for the sealed opening 133. The closure or door 132 is clamped in place by means of a suitable clamping device 134, when access is not required.

The chute or hopper 130 is removably connected to the bottom of the cylindrical member 48 at the sealed juncture 135. Disposed in the chute 130, is a pressure plate 136, provided with a switching device 137.

An exit auger 138, is disposed in the bottom of the hopper 130, for delivering silage from the hopper 130, up outwardly of the silo, for use. The auger 138 is driven, through a suitable transmission device 140, by means of an electric motor 141, with the auger 138, generally being continuously driven as silage is being removed from a silo.

As the rotation of the auger 12 on its own axis, and its sweeping motion across the silo floor, biting into the silage, delivers silage into the opening 12, and as the hopper 130 becomes filled, the auger 138 is continually removing the silage. However, if such occurs at a greater rate than removal can take place by means of the auger 138, and silage accumulates in the hopper 130, electric leads 132, 142 and 143, triggered by the switching device 137, will cause the motor 138 to shut down, until sufficient silage can be removed from the hopper 130 by the auger 138, that the switching device 137, will again be activated, upon the sensing of less pressure against the plate 136. Consequently, the motor 138 will again be reactivated such that silage can once again be delivered to the opening 16, by the auger 12.

It will be apparent from the foregoing that the purposes of the invention are accomplished, in providing for the handling of silage, and in the presentation of a novel appartus for doing so. While various modifications may be made in the details of construction, and in use and operation of the device in accordance with the present invention, all will be within the spirit and scope of the invention as defined in the appended claims.

What is claimed is:

1. In a silo unloader of the bottom unloader type having an unloading auger generally radially disposed at the bottom of the silo and mounted for rotation on its own axis for intermittent arcuate sweeping movement across the floor of the silo, including an auger mount substantially at the center of the silo at about the floor level, said mount being rotationally moveable about a generally vertical axis and having a ring-like portion disposed in the silo floor and moveable therewith, including intermittent drive means for engaging said ring-like portion and driving it in a series of repeated intermittent arcuate motions, for driving the auger in a uniform intermittent sweeping motion across the silo floor, whereby silage may be delivered through a generally centrally located discharge opening in the silo floor, wherein a drive shaft is provided inside said silo, and motor means is provided for driving said drive shaft in a continuous rotational motion with means operatively connecting said drive shaft and said auger for rotationally driving the auger on its own axis in a continuous rotational motion from said drive shaft, and wherein conversion means is provided in said silo at the general center thereof as part of said intermittent drive means, operatively connected to said drive shaft for converting continuous rotational motion from said drive shaft to an intermittent motion provided to said intermittent drive means.

2. In a silo unloader of the bottom unloader type having an unloading auger generally radially disposed at the bottom of the silo and mounted for rotation on its own axis for intermittent arcuate sweeping movement across the floor of the silo, including an auger mount substantially at the center of the silo at about the floor level, said mount being rotationally moveable about a generally vertical axis and having a ring-like portion disposed in the silo floor and moveable therewith, including intermittent drive means for engaging said ring-like portion and driving it in a series of repeated intermittent arcuate motions, for driving the auger in a uniform intermittent sweeping motion across the silo floor, whereby silage may be delivered through a generally centrally located discharge opening in the silo floor, wherein a central generally vertical drive shaft is provided, and motor means is provided for driving said drive shaft in a continuous rotational motion, with means operatively connecting said drive shaft and said auger for rotationally driving the auger on its own axis, in a continuous rotational motion from said drive shaft, and wherein conversion means is provided as part of said intermittent drive means, operatively connected to said drive shaft, for converting continuous rotational motion from said drive shaft to an intermittent motion provided to said intermittent drive means.

3. The apparatus of claim 2, wherein said conversion means comprises two successive operatively connected torque multiplier means, each for converting a greater motion of lower torque into a lesser motion of greater torque.

4. The apparatus of claim 3, wherein said two torque multiplier means include first eccentric means for transferring continuous rotational drive of said drive shaft into a push-pull linear motion of a first drive rod means, ratchet means operatively connecting said first drive rod means and a rotational means for transferring the push-pull motion of the drive rod into intermittent rotational motion of said rotational means, and second eccentric means carried by said rotational means for transferring the intermittent rotational motion of said rotational means to a push-pull motion of a second drive rod means, and second ratchet means operatively connecting said second drive rod means and ring-like portion for transferring the push-pull motion of said second drive rod means to an intermittent rotational motion of said mount.

5. The apparatus of claim 2, wherein said motor means comprises a single motor.

6. The apparatus of claim 4, wherein said second drive rod means comprises a pair of drive rods, and wherein said second eccentric means comprises a pair of eccentrics carried by the same shaft of said rotational means, and wherein said pair of eccentrics and said pair of drive rods comprise means for one of the drive rods alternately, linearly moving and engaging said ring-like portion and arcuately moving the same while the other drive rod moves in a disengaged linear motion to be positioned for the next engagement with the ring-like portion.

7. The apparatus of claim 6, wherein said ring-like portion comprises a toothed ring periphery, and wherein said second drive rod means includes tooth-engaging dogs.

8. The apparatus of claim 4, wherein said second ratchet means includes a spring-biased pawl member in engagement with a toothed periphery of said rotational means.

9. The apparatus of claim 1, wherein a silage discharge chute is located beneath the discharge opening; with a discharge auger disposed in the opening for unloading silage from the bottom of the chute; silage responsive actuator means in aid chute for sensing an accumulation of silage therein and for accordingly controlling the operation of said unloading auger.

10. The apparatus of claim 5, wherein a silage discharge chute is located beneath the discharge opening; with a discharge auger disposed in the opening for unloading silage from the bottom of said chute; silage responsive actuator means in said chute for sensing an accumulation of silage therein and for accordingly controlling the operation of said single motor.

11. The apparatus of claim 10, wherein said discharge auger is provided with a separate motor means, for generally continuously driving of said discharge auger.

12. The apparatus of claim 5, including disconnect means for disconnecting said conversion means from operative connection with said drive means.

13. The apparatus of claim 4, including disconnect means for disconnecting said first drive rod means from said rotational means.

14. The apparatus of claim 13, wherein said disconnect means comprises a manually operable spring loaded plunger, normally spring-biased into engagement between teeth on said rotational means and repositionable out of said engagement.

15. The apparatus of claim 1, wherein said conversion means comprises two successive operatively connected torque multiplier means, each for converting a greater motion of lower torque into a lesser motion of greater torque.

16. The apparatus of claim 15, wherein said two torque multiplier means include first eccentric means for transferring continuous rotational drive of said drive shaft into a push-pull linear motion of a first drive rod means, ratchet means operatively connecting said first drive rod means and a rotational means for transferring the push-pull motion of the drive rod into intermittent rotational motion of said rotational means, and second eccentric means carried by said rotational means for transferring the intermittent rotational motion of said rotational means to a push-pull motion of a second drive rod means, and second ratchet means operatively connecting said second drive rod means and ring-like portion for transferring the push-pull motion of said second drive rod means to an intermittent rotational motion of said mount.

17. The apparatus of claim 16, wherein said second drive rod means comprises a pair of drive rods, and wherein said second eccentric means comprises a pair of eccentrics carried by the same shaft of said rotational means, and wherein said pair of eccentrics and said pair of drive rods comprise means for one of the drive rods alternately, linearly moving and engaging said ring-like portion and arcuately moving the same while the other drive rod moves in a disengaged linear motion to be positioned for the next engagement with the ring-like portion.

* * * * *